United States Patent [19]
Nohmi et al.

[11] Patent Number: 5,299,301
[45] Date of Patent: Mar. 29, 1994

[54] IMAGE DISPLAYING METHOD AND APPARATUS

[75] Inventors: Makoto Nohmi; Shinichiro Miyaoka, both of Kawasaki; Motohisa Funabashi, Sagamihara, all of Japan

[73] Assignee: Hitachi, Ltd., Tokyo, Japan

[21] Appl. No.: 989,477

[22] Filed: Dec. 7, 1992

Related U.S. Application Data

[63] Continuation of Ser. No. 700,959, May 14, 1991, abandoned, which is a continuation of Ser. No. 216,664, Jul. 7, 1988, abandoned.

[30] Foreign Application Priority Data

Jul. 10, 1987 [JP] Japan ............................ 62-172503

[51] Int. Cl.$^5$ .......................................... G06F 15/66
[52] U.S. Cl. ....................................... 395/131; 395/129
[58] Field of Search ............... 340/706, 731, 950, 798, 340/799, 747, 703; 358/160, 166, 168; 395/129, 131

[56] References Cited

U.S. PATENT DOCUMENTS

| | | | |
|---|---|---|---|
| 4,755,814 | 7/1988 | Olsen | 340/799 |
| 4,757,470 | 7/1988 | Bruce et al. | 364/900 |
| 4,763,118 | 8/1988 | Takai | 340/735 |
| 4,766,555 | 8/1988 | Bennett | 364/518 |
| 4,768,157 | 8/1988 | Chauvel et al. | 364/521 |
| 4,782,447 | 11/1988 | Veno et al. | 364/449 |
| 4,803,642 | 2/1989 | Muranaga | 364/513 |
| 4,807,157 | 2/1989 | Fukushima et al. | 364/521 |
| 4,857,899 | 8/1989 | Ishii | 340/701 |
| 4,868,554 | 9/1989 | Aoki et al. | 340/735 |
| 4,908,610 | 3/1990 | Yamamuro et al. | 340/703 |
| 4,908,779 | 3/1990 | Iwata | 364/518 |

OTHER PUBLICATIONS

Animation and 3D Color Display of Multiple-Variable Data: Application to Semiconductor Design by Edward J. Farrell et al IBM J. Res. Develop. vol. 29, No. 3, May 1985, pp. 302-315.

Primary Examiner—Phu K. Nguyen
Attorney, Agent, or Firm—Antonelli, Terry, Stout & Kraus

[57] ABSTRACT

The king of a partial image designated on the display screen is determined and desired processing is effected at high speeds. For this purpose, the region designated on the displayed image and the attribute or identity data of that region are stored corresponding to each other. The attribute or identity of the partial image corresponding to the region is retrieved by using the attribute or identity data. The region of the partial image having a predetermined attribute inclusive of the retrieved attribute is picked up, and a predetermined operation is effected on the image data in the region that is picked up.

12 Claims, 4 Drawing Sheets

| RE-GION | CODE(A) | ATTRIBUTE | |
|---|---|---|---|
| a | 0 0 1 | SKY | WEATHER=FINE, SEASON=SPRING |
| b | 0 1 0 | HOUSE | ADDRESS=XYZ, OWNER=P |
| c | 0 1 1 | CAR | TYPE=C, OWNER=P |
| d | 1 0 0 | PERSON | NAME=P, SEX=MALE |
| e | 1 0 1 | TREE | KIND=CHERRY |
| f | 1 1 0 | GARDEN | OWNER=P, SURFACE=LAWN |
| g | 1 1 1 | ROAD | ROUTE=R |

IMAGE DISPLAYING METHOD AND APPARATUS

This application is a Continuation application of Ser. No. 07/700,959, filed May 14, 1991, now abandoned which was a continuation of application Ser. No. 07/216,664 filed Jul. 7, 1988 and now abandoned.

BACKGROUND OF THE INVENTION

The present invention relates to an image displaying method and an apparatus therefor. More specifically, the invention relates to an image displaying method and apparatus adapted for processing the retrieval and the designation input at high speeds in order to enhance the response characteristics in a system which executes the retrieval and the designation input using as interfaces the images such as document, image file, storage, retrieval, work station, and the like.

In the conventional image displaying apparatus, in general, the contents of a frame buffer memory corresponding to the coordinates of the display are read out, and the pixel data that are read out are subjected to analog conversion and are displayed on a cathode-ray tube (CRT) or the like. In this case, there have been known frame buffers of the type which stores the brightnesses of pixels and color data only, and of the type which designates limited colors that are called color pallets. There are further available frame buffers of the type which displays characters in a superimposed manner by adding attribute data in addition to the image data. In these frame buffers, however, the pixel data are used simply for designating the shade and color but are not used for representing the meaning of the image that is displayed, i.e., they are not used for representing the meaning such as to 37 mountain" or "river" when the data pertains to the scenery.

Literature related to the above-mentioned image displaying apparatus includes, for example, Nikkei Electronics, "Three-Dimensional Color Graphic Display Apparatus based upon Advanced Shading Technology", Apr. 7, 1986, p.p. 170-194, Nikkei Electronics, "Display Function of Work Station Reinforced with Dual Port Memory and Gate Array", Jun. 30, 1986, p.p. 225-252, Nikkei Electronics, "Color Bit Map Display equipped with Frame Buffer which is accessible like a Main Storage", May 20, 1985, p.p. 258-281.

According to the above prior art, the image displaying apparatus simply displays images or character patterns but does not display the meaning of the image. Therefore, even if the image displayed on the image displaying apparatus is subjected to the pointing, the data obtained therefrom are simply related to brightness and color. So far, therefore, the processing apparatus has been equipped with a table for making the coordinates pointed to correspond to the image, in order to determine what it is that is pointed to based on the comparison. When the image is a natural scene, however, it is almost impossible to render the decision. Even in-the case of computer graphics, a lot of processing is required to render the decision when the figure is complex. Even when it is determined what it is, it is necessary to rewrite the image data in the frame buffer memory in order to effect some processing such as highlight (partially brighten) for the pointed to portions only, requiring extended periods of time for processing and transfer, and making it difficult to accomplish high response performance.

SUMMARY OF THE INVENTION

The object of the present invention is to provide an image displaying method which is free from the aforementioned problems inherent in the prior art, which determines what it is that was pointed to in the partial image on the display, and which effects the processing for the designated portion of the image at high speeds, and an apparatus therefor.

In order to solve the aforementioned problems, the present invention deals with an image displaying method comprising a first step of storing the attribute data of a designated region on the displayed image relative to said region; and a second step for either retrieving the attribute of a partial image corresponding to said region that is designated on the display screen based upon the attribute data or picking upon the region of the partial image having a predetermined attribute that includes the attribute retrieved by said first step and effecting a predetermined operation on the image data of said region.

In order to solve the aforementioned problems, furthermore, the image displaying apparatus of the present invention comprises a first data storage means for storing and reading the image data that are to be displayed, a second data storage means for storing the attribute data of said image, and means which reads image data and attribute data from the first and second data storage means in synchronism with each other, and which controls the writing and image operation.

According to the present invention, the data representing the attribute of pixels are arranged in parallel with the image data to correspond to pixels of the frame buffer memory for display, enabling instantaneous determination of the attribute of the pixels pointed to the attribute data are read out in parallel with the scanning and display of the image, and a designated operation is effected for the pixels having designated attributes in parallel with the display of the image according to a separately designated attribute and the content of the operation thereof, making it possible to execute at high speeds the operation of highlighting or blinking for a designated "object" in the natural scene.

DETAILED DESCRIPTION OF THE PREFERRED EMBODIMENTS

Figure 2:
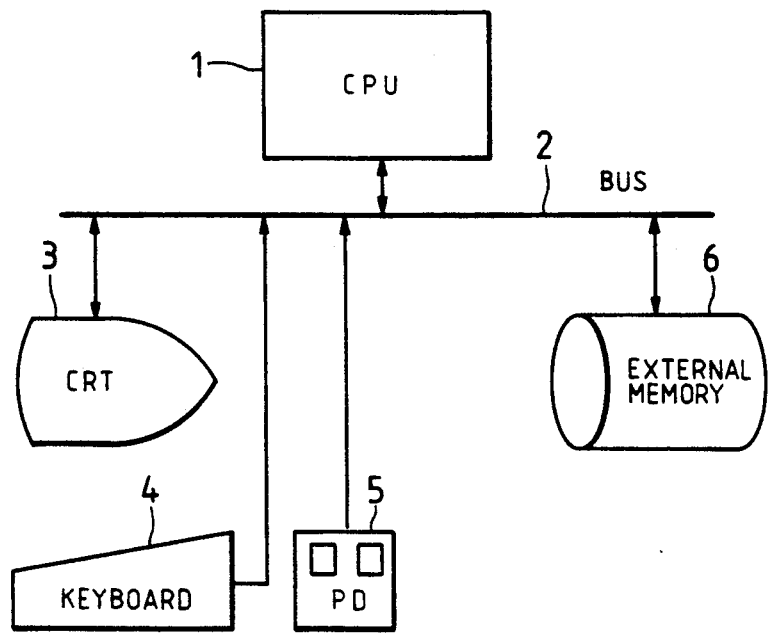
FIG. 2 is a diagram illustrating an image file system to which the present invention is adapted.

FIG. 2 is a diagram showing the constitution of an image file system to which the present invention is adapted.

In FIG. 2, a central processing unit 1 (hereinafter referred to as CPU 1), which effects a variety of types of processing, is connected via a bus 2 to an image display 3 which is an object of the present invention, to a keyboard 4 for inputting characters, to a pointing device (e.g., a mouse) 5 for designating the image position, and to an external mass storage 6 for storing the image data. As required, furthermore, the CPU 1 is connected to an image data input device via the bus 2.

Being constructed as described above, the CPU 1 sends the image data to the frame buffer memory in the image display 3 so that the image is displayed. A person (operator) designates icon and region for the displayed image on the screen using pointing device 5 and effects such operations as inputting the operation command, selecting the menu, expanding or contracting the image, and moving the image.

Figure 1:
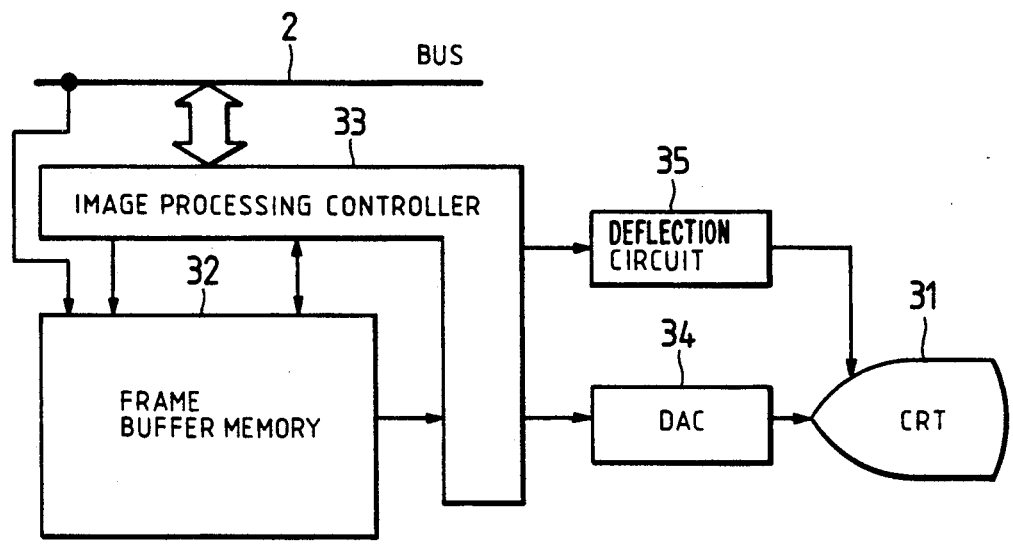
FIG. 1 is a schematic diagram which illustrates the structure of an image displaying apparatus according to an embodiment of the present invention.

FIG. 1 is a diagram which schematically illustrates the internal structure of the image displaying apparatus according to an embodiment of the present invention.

In FIG. 1, the image data sent from the CPU 1 are written into the frame buffer memory 32 directly or via an image processing controller 33. The image processing controller 33 reads the image data from the frame buffer memory 32 in synchronism with synchronizing signals formed by a scanning controller 331 (FIG. 4), converts the data into brightness and chrominance signals through a digital-to-analog converter 34, and displays the image on the CRT 31.

Figure 3:
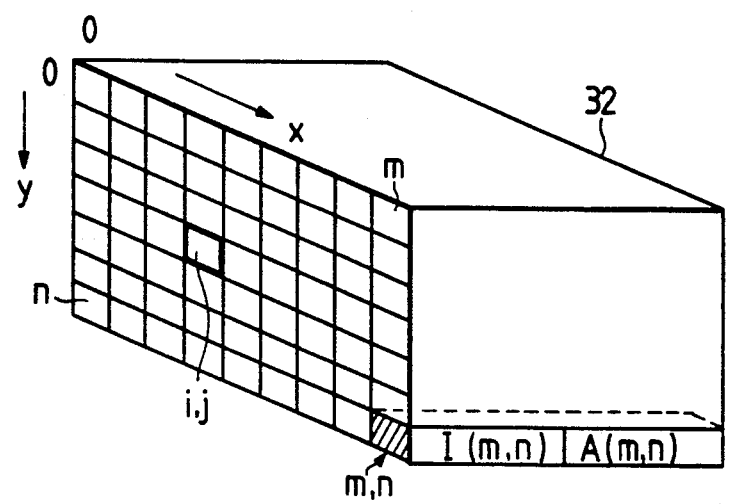
FIG. 3 is a diagram which shows the logical construction of a frame buffer memory of FIG. 1.

FIG. 3 is a diagram illustrating the structure of the frame buffer memory 32 of FIG. 1, i.e., illustrating the arrangement of pixel data corresponding to the coordinates x, y on the screen.

Pixels of the frame buffer memory 32 are constituted by image data I and a portion of attribute or identity data A, and the data I and A are simultaneously or independently written into or read from the CPU 1. To display the data, on the other hand, the frame buffer memory 32 is scanned in the horizontal direction (x) and in the vertical direction (y), so that the image data I and the attribute or identity data A are read out from the frame buffer memory 32 simultaneously. The frame buffer memory 32 is usually comprised of a dual port memory which permits the input and output to be effected independently so that it can be accessed om the CPU 1 while the data are being displayed. A dual port memory, however, is not necessarily required if switching is effected by the image processing controller 33. In this embodiment, however, the frame buffer memory is comprised of a dual port memory to simplify construction.

Figure 4:
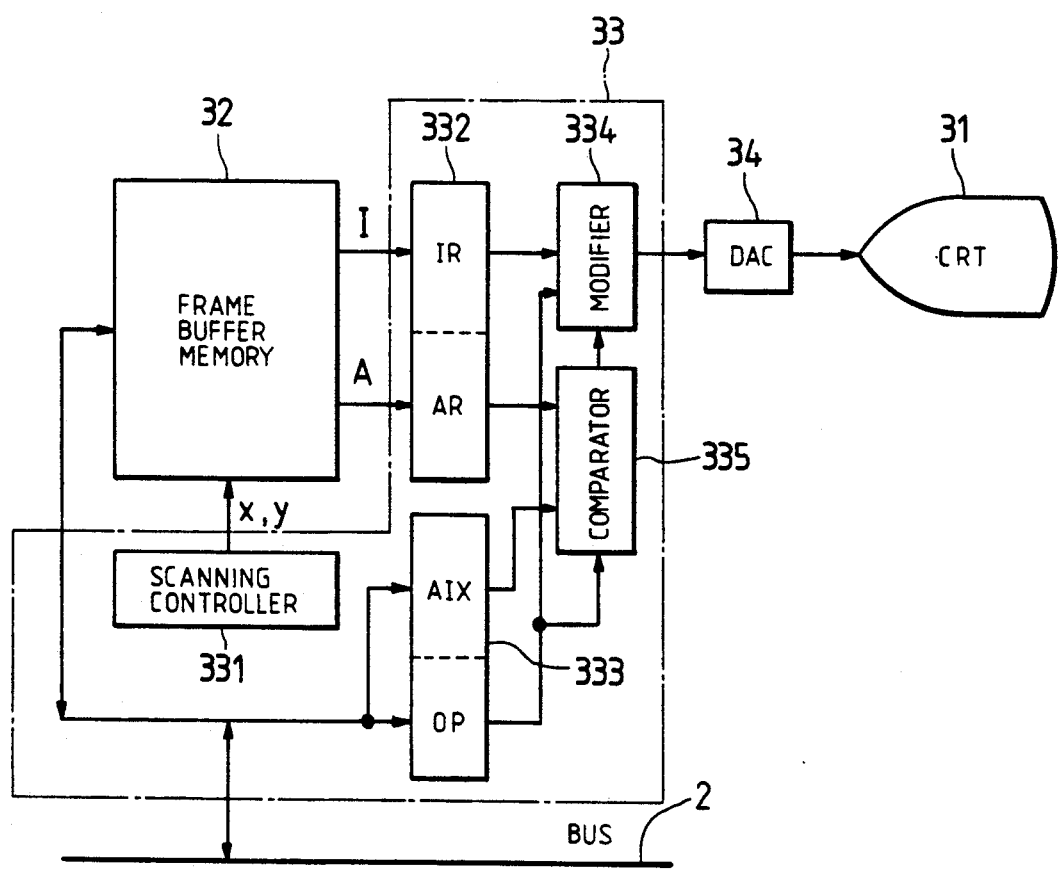
FIG. 4 is a diagram which illustrates in detail the image process control unit of FIG. 1.

FIG. 4 is a diagram which illustrates in detail the image processing controller 33 of FIG. 1.

In FIG. 4, a register 332 consists of an IR portion and an AR portion allocated to the image data I and the attribute or identity data A, the register 332 holding the data read from an address of the frame buffer memory 32 designated by a scanning controller 331. An instruction register 333 consists of an AIX portion that indicates the designated attribute or identification and an OP portion that indicates the operation to be done on the image data. A comparator 335 compares the attribute A read from AR portion with the content of the AIX portion. Concretely speaking, the comparator compares the values or performs the OR, AND, or exclusive OR operations. The kind of operation in the comparator is determined by the OP portion of the instruction register 333. A modifier 334 changes the output value of the IR portion of the register 332 being designated by the OP portion of the instruction register 333.

Figure 5I:
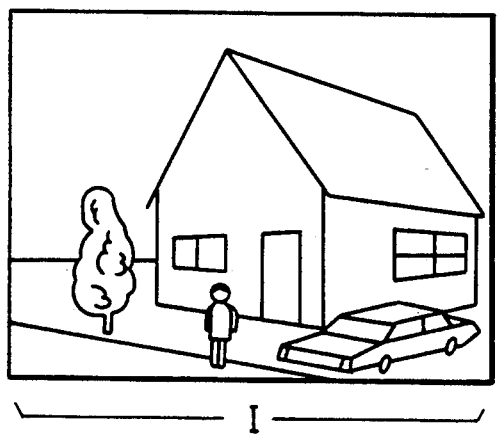
FIGS. 5(*i*) and 5(*ii*) are, respectively a diagram which shows the display and an attribute map.
Figure 5:
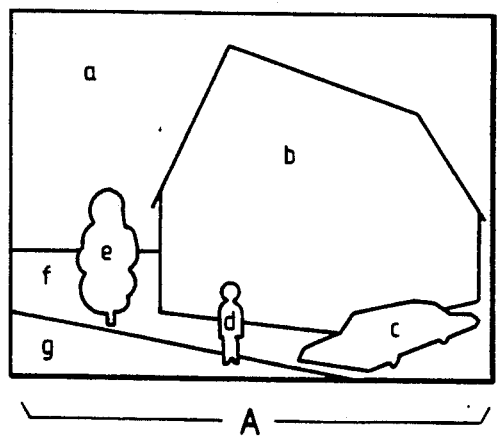

FIGS. 5(i) and 5(ii) illustrate how to use the thus constructed apparatus. FIG. 5(i) shows an image displayed on the CRT 31, which chiefly consists of image data I among the pixel data. FIG. 5(ii) shows the attribute or identity data A of pixels of the image of FIG. 5(i) relative to the image of FIG. 5(i). Codes corresponding to the symbols of the regions "a" to "g" indicated by drawings in FIG. 5(ii) are stored in the attribute or identity data portion A of each of the pixels.

Figures 6, 7:
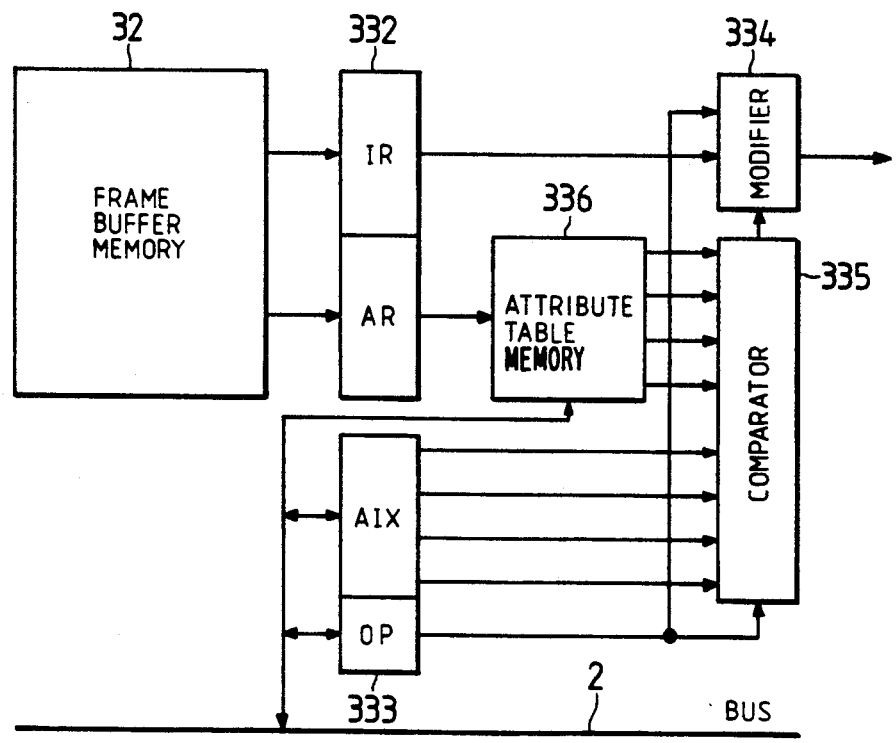
FIG. 6 is a diagram showing the constitution of an attribute table.
FIG. 7 is a diagram showing the constitution of an image displaying apparatus according to another embodiment of the present invention.

FIG. 6 shows examples of the codes and where binary numbers "001" to "111" correspond to the identified regions "a" to ∓g" of FIG. 5(ii). Among the pixel data, the attribute identity portion A which is "001" represents "sky" and the attribute identity portion A which is "100" represents a "person".

To determine what "object" is indicated by the pointing device 5 using the abovementioned apparatus, the CPU 1 receives the pixel data of the coordinate to determine the code of the attribute identity portion A. Thus, it is readily determined what "object" is indicated by the pointing device.

When it is desired to highlight (brightly display) a "car" in FIG. 5(i), a code "011" that identifies the "car" is sent to the AIX portion of the instruction register 333 of FIG. 4, and a code that indicates highlight is sent to the OP portion from the CPU 1. Then, the comparator 335 compares and determines whether the portion A of data read from the frame buffer memory 32 is "011". When the pixel corresponds the comparator 335 responds to the true comparison by sending a signal to the modifier 334 where the image data is, for example, doubled and is then displayed on the CRT 31 with the brightness being changed. In this case, the region "c" only of FIG. 5(ii) is brightly displayed, i.e., the "car" only is brightly displayed.

When the attribute of the partial image is taken into consideration, on the other hand, the attribute of the "object" is not just one. In the case of the "person", for example, there are contained many attributes, such as "name", "sex" and the like. They can be all represented by each pixel in the frame buffer memory 32 which, however, results in considerable redundancy. As shown in FIG. 7, therefore, only the code (region is indicated in this case) that distinguishes the whole attribute is stored in each pixel in the frame buffer memory 32, an attribute table memory or identity memory 336 is newly provided that will be referred to by the code, and the attribute or identity data produced by the attribute table memory 336 is compared with they contents of the instruction register 333 to minimize the contents of the memory.

Being constituted as described above, the attribute item, e.g., the instruction "Highlight the material owned by P" is set to the instruction register 333, so that "house", "car" and "garden" are brightly displayed. It is further allowable to divide the attribute data in the frame buffer memory 32 into a plurality of portions, to make reference to a plurality of attribute tables, or to provide some portion directly using the attribute portion in the frame buffer memory 32, or based on the combination of indirect methods using attribute tables.

In this embodiment as described above, the object expressed on the natural scene is pointed to on the screen, the attribute data are retrieved, or the detailed explanatory image or the explanation description are called, in order to retrieve the file at high speed in a form natural to a human being.

In the aforementioned embodiment, the attribute or identity data was stored in the frame buffer memory 32 for all pixels on the frame buffer memory 32. In order to reduce the memory, however, it is allowable to provide an attribute data memory for a plurality of neighboring pixels, for example, for 2×2 pixels or four pixels.

Furthermore, though this embodiment has dealt with the display only, it is also allowable to cut out pixels of a predetermined attribute only and to send them to the CPU 1 or to write from the CPU 1 to the frame buffer memory 32 according to the attribute of pixels of the frame buffer memory 32. In this case, when it is required to effect the processing in parallel with the display, an attribute designation register determination circuit for transfer is provided in the interface portion between the frame buffer memory 32 and the CPU 1 like that of the display.

The aforementioned embodiment is effective particularly for a natural scene and can also be adapted to computer graphics (CG) as a matter of course. For instance, the embodiment makes it possible to easily execute the window processing having a complex shape.

According to the present invention as described above, what is pointed to on the display screen is determined by retrieving the attribute data thereof and the result is subjected to the processing. Therefore, the file is retrieved at high speed in a form natural to a human being. Moreover, only the object on the screen to be highlighted can be operated, making it possible to greatly improve the man-machine operability.

What is claimed is:

1. An image displaying method comprising:
    reading from a memory image data indicative of an image to be displayed in a succession of display frames, the image including a plurality of regions, each region including at least a portion of each of a plurality of scan lines, and identity data corresponding to the read image data and identifying the region of the corresponding image data;
    receiving an input command indicative of a modification to be made to an entire selected region of the image to be displayed;
    comparing the read identity data with the received input command;
    when the comparison indicates that a predetermined relationship is satisfied, then during the next display frame modifying all of the scan lines within the entire selected region of the image in accordance with the input command; and
    displaying during succeeding display frames the image with the entire selected region modified in accordance with the input command.

2. An image displaying apparatus comprising:
    memory means for storing image data indicative of an image to be displayed in a succession of display frames, the image including a plurality of regions, each region including at least a portion of each of a plurality of scan lines, and identity data corresponding to the image data and identifying the region of the corresponding image data;
    control means for reading from said memory means image data for an image to be displayed and identity data corresponding to the read image data;
    input means for applying an input command indicative of a modification to be made to an entire selected region of the image to be displayed;
    comparison means for comparing identity data read from said memory means with an input command applied by said input means and providing an indication of whether a predetermined relationship between the read identity data and the input command is satisfied or not;
    modifying means, responsive to an indication from said comparison means that the predetermined relationship is satisfied, for modifying all of the scan lines within the entire selected region of the image during the next display frame in accordance with the input command; and
    display means for displaying the image during succeeding display frames with the entire selected region modified in accordance with the input command.

3. An image displaying apparatus as claimed in claim 2 wherein said memory means comprises a frame buffer memory for storing as a bit map of the image data and first identity data corresponding to the image data, and an identity memory for storing second identity data indicative of identities of the respective regions of the display.

4. An image displaying method comprising:
    reading from a memory image data and identity data, the image data indicative of an image to be displayed in a succession of display frames, the image being made up of a plurality of scan lines and including a plurality of regions, each region including at least a portion of each of a plurality of the scan lines, the identity data corresponding to the regions of the image and identifying the corresponding regions of the image;
    receiving input commands, each input command indicative of a modification to be made to an entire selected region of the image to be displayed;
    comparing the read identity data with a received input command;
    when the comparison indicates that a predetermined relationship is satisfied, modifying all of the scan lines within the entire selected region of the image during the next display frame in accordance with the received input command; and
    displaying the image with the entire selected region modified in accordance with the received input command.

5. An image displaying apparatus comprising:
    memory means for storing image data and identity data, the image data indicative of an image to be displayed in a succession of display frames, the image being made up of a plurality of scan lines and including a plurality of regions, each region including at least a portion of each of a plurality of scan lines, the identity data corresponding to the regions of the image and identifying the corresponding regions of the image;
    control means for reading from said memory means image data for an image to be displayed and identity data corresponding to the read image data;
    input means for applying input commands, each input command indicative of a modification to be made to an entire selected region of the image to be displayed;
    comparison means for comparing identity data read from said memory means with an input command applied by said input means and providing an indication of whether a predetermined relationship between the compared identity data and input command is satisfied or not;

modifying means, responsive to an indication from said comparison means that the predetermined relationship is satisfied, for modifying all of the scan lines within the entire selected region of the image during the next display frame in accordance with the compared input command; and display means for displaying the image with the entire selected region modified in accordance with the compared input command.

6. An image displaying apparatus as claimed in claim 5 wherein said memory means comprises a frame buffer memory for storing as a bit map the image data and first identity data corresponding to the image data, and an identity memory for storing second identity data indicative of identities of the respective regions of the display.

7. An image displaying method comprising:

reading from a memory image data indicative of an image to be displayed in a succession of display frames, the image including a plurality of regions, each region including at least a portion of each of a plurality of scan lines, the image data including attribute data indicative of attributes of the respective regions and identity data corresponding to the attribute data and identifying the region of the corresponding attribute data;

receiving an input command indicative of a modification to be made to a specified attribute of a selected region of the image to be displayed;

comparing the read identity data with the received input command;

when the comparison indicates that a predetermined relationship is satisfied, modifying the specified attribute of the selected region so that during the next display frame all of the scan lines within the selected region of the image are modified in accordance with the input command; and displaying during succeeding display frames the image with the selected region modified in accordance with the input command.

8. An image displaying apparatus comprising:

memory means for storing image data indicative of an image to be displayed in a succession of display frames, the image including a plurality of regions, each region including at least a portion of each of a plurality of scan lines, the image data including attribute data indicative of attributes of the respective regions and identity data corresponding to the image data and identifying the region of the corresponding image data;

control means for reading from said memory means image data for an image to be displayed;

input means for applying an input command indicative of a modification to be made to a specified attribute of a selected region of the image to be displayed;

comparison means for comparing identity data read from said memory means with an input command applied by said input means and providing an indication of whether a predetermined relationship between the read identity data and the input command is satisfied or not;

modifying means, responsive to an indication from said comparison means that the predetermined relationship is satisfied, for modifying the specified attribute of the selected region of the image so that during the next display frame all of the scan lines within the selected region of the image are modified in accordance with the input command; and display means for displaying the image during succeeding display frames with the selected region modified in accordance with the input command.

9. An image displaying method comprising:

reading from a memory image data indicative of an image to be displayed in a succession of display frames, the image being made up of a plurality of scan lines and including a plurality of regions, each region including at least a portion of each of a plurality of the scan lines, the image data including attribute data indicative of attributes of the respective regions and identity data corresponding to the region of the image and identifying the corresponding regions of the image;

receiving input commands, each input command indicative of a modification to be made to a specified attribute of a selected region of the image to be displayed;

comparing the read identity data with a received input command;

when the comparison indicates that a predetermined relationship is satisfied, modifying the specified attribute of the selected region so that during the next display frame all of the scan lines within the selected region are modified in accordance with the received input command; and displaying the image with the entire selected region modified in accordance with the received input command.

10. An image displaying apparatus comprising:

memory means for storing image data indicative of an image to be displayed in a succession of display frames, the image being made up of a plurality of scan lines and including a plurality of regions, each region including at least a portion of each of a plurality of the scan lines, the image data including attribute data indicative of the attributes of the respective regions and identity data corresponding to the region of the image and identifying the corresponding regions of the image;

control means for reading from said memory means image data for an image to be displayed;

input means for applying input commands, each input command indicative of a modification to be made to a specified attribute of a selected region of the image to be displayed;

comparison means for comparing identity data read from said memory means with an input command applied by said input means and providing an indication of whether a predetermined relationship between the compared identity data and input command is satisfied or not;

modifying means, responsive to an indication from said comparison means that the predetermined relationship is satisfied, for modifying the specified attribute of the selected region of the image so that during the next display frame all of the scan lines within the selected region of the image are modified in accordance with the compared input command; and display means for displaying the image with the entire selected region modified in accordance with the compared input command.

11. An image displaying method, comprising:

reading image data and identity data from a memory, the image data defining an image to be displayed in a succession of display frames, the image including a plurality of regions, the identity data corresponding to the read image data and identifying the regions of the corresponding image data;

receiving an image modification command including an identification portion and a modification portion, the identification portion identifying a region of the image to be modified, the modification portion defining a modification to be made to the region identified by the identification portion;

comparing the read identity data with the received identification portion;

when the comparison indicates that the read identity data and the received identification portion identify the same region of the image, modifying the read image data in accordance with the received modification portion; and displaying the resulting modified image during succeeding display frames.

12. An image displaying apparatus, comprising:

a memory for storing image data and identity data, the image data defining an image to be displayed, the image including a plurality of regions, the identity data corresponding to the image data and identifying the regions of the corresponding image data;

a controller for reading from said memory image data defining an image to be displayed and identity data corresponding to the read image data;

input means for applying an image modification command to said apparatus, the image modification command including an identification portion and a modification portion, the identification portion identifying a region of the image to be modified, the modification portion defining a modification to be made to the region identified by the identification portion;

a comparer for comparing read identity data with an applied modification portion;

modification means responsive to said comparer indicating that the read identity data and the applied identification portion identify the same region of the image, for modifying the read image data in accordance with the applied modification portion; and a display device for displaying the resulting image.

* * * * *